United States Patent Office 3,132,377
Patented May 12, 1964

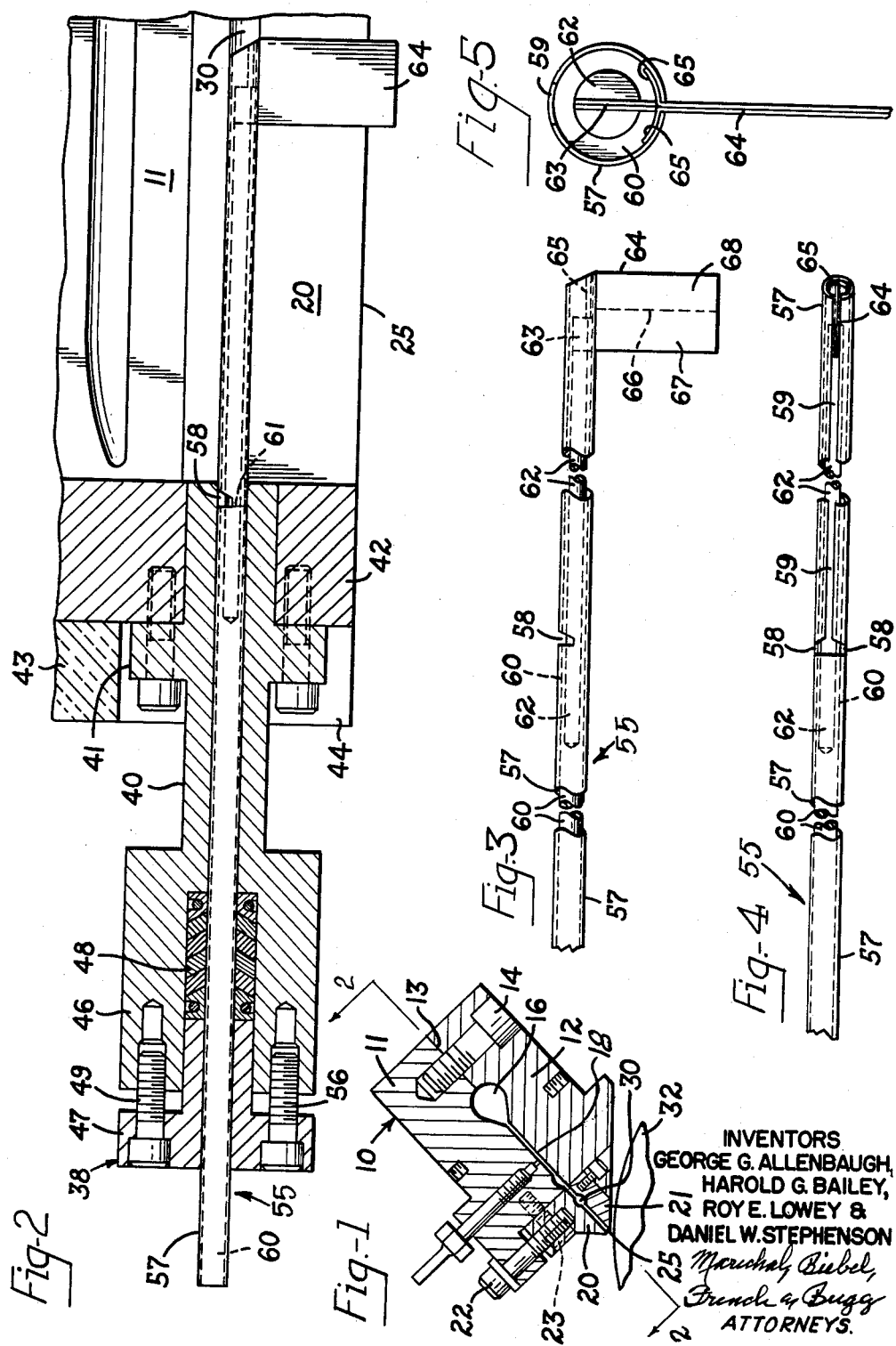

3,132,377
DECKLE ROD FOR AN EXTRUSION DIE
George G. Allenbaugh and Harold G. Bailey, Akron, and Roy E. Lowey and Daniel W. Stephenson, Cuyahoga Falls, Ohio, assignors, by mesne assignments, to Blaw-Knox Company, Pittsburgh, Pa., a corporation of Delaware
Filed July 26, 1961, Ser. No. 127,051
4 Claims. (Cl. 18—12)

This invention relates to flat film dies for extrusion machines and more particularly to a deckle rod construction in combination with a flat film die for limiting and controlling the width of plastic extrusion therefrom. This application is a continuation-in-part of the application of Schroyer et al., S.N. 848,301, filed October 23, 1959, now abandoned.

It is important to the operation of a flat film die that provision be included for limiting the width of extrusion. Internal width limiting devices associated with extrusion nozzles are known as deckle rods and are preferably adjustable within suitably formed passageways in the die to limit the width of extrusion. For successful operation, they should provide a smooth edge to the material being extruded without feathering and must provide an effective seal for the linear length of the nozzle blocked off. These requirements are difficult to obtain in high temperature, high pressure plastic extruding machines, which may operate in the order of 600° F. and are usually designed to extrude a wide variety of plastic materials such as may be used for coating paper stock or forming self-supporting plastic films, and the plastic material being extruded will therefore vary widely in temperature and viscosity.

The deckle rod of this invention is particularly designed to take advantage of the extruding force of the plastic material to form a seal within the extrusion nozzle. A pair of cooperating, longitudinally extending grooves are provided within the land area of the extruding nozzle a distance remote from the outlet orifice thereof. Within the chamber or passageway thus formed is fitted an axially movable deckle rod of generally cylindrical form. The rod serves to maintain a seal within the deckle rod passageway formed by the grooves in spite of variations which occur due to heat and result in the passageway becoming non-linear either in section or along its length.

It is therefore an object of this invention to provide a flat film die for extruding plastic film having a longitudinally extending passageway formed in intersecting relation to the orifice slot thereof and having an elongated generally cylindrical deckle rod slidably received therein.

A further object of this invention is the provision of a flat film die for extruding plastic film including an elongated expansible deckle rod received within a suitable chamber formed in the nozzle portion of the die.

Another object of this invention is the provision of a flat film die including a deckle rod consisting of a flexible hollow rod.

A still further object of this invention is the provision of a flat film die including extruding nozzle parts forming an extruding orifice or slot and having therein cooperating parts of a deckle rod passageway for the reception of a substantially cylindrical axially movable rod member therein subject to the pressures in such passageway to form a seal therewith.

Another object of this invention is the provision of a flat film die including an internal deckle rod formed of hollow thin-walled material being open at one side thereof subject to the extruding pressure within the nozzle for expansion and sealing in a deckle rod chamber.

A still further object of this invention is the provision of a deckle rod having on the extended end thereof a flag member which extends into the extrusion slot and is axially adjustable therein to limit the extrusion width.

Other objects and advantages of the invention will be apparent from the following description, the accompanying drawings and the appended claims.

In the drawings—

FIG. 1 is a fragmentary section of the nozzle portion of a flat film die constructed according to this invention;

FIG. 2 is a central longitudinal section through the nozzle of FIG. 1 showing the arrangement of the deckle rod and rod retaining mechanism and taken generally along the line 2—2 of FIG. 1;

FIG. 3 is a side elevation of the deckle rod assembly of FIG. 2;

FIG. 4 is a top plan view of the rod of FIG. 3; and

FIG. 5 is an end elevation of the deckle rod on a somewhat enlarged scale as compared to FIGS. 3 and 4.

Referring to the drawing, which illustrates a preferred embodiment of this invention, the nozzle portion of a flat film die is shown at 10 in FIG. 1. The die 10 includes an outer die half 11 and an inner die half 12 both formed of metal and joined together at a parting plane 13 by a series of bolts 14.

The die parts 11 and 12 form cooperating portions of a main die cavity 16 which extends substantially along the length of the die 10. Communicating with the transverse passageway 16 is an inner narrow slot 18 formed by relieving the die parts 11 and 12 at the adjacent surfaces thereof. The die cavity 16 is fed from a centrally disposed heated passageway (not shown) which may be connected to the barrel of an extruding machine. The central passageway, the flat film die parts, and the heating arrangement therefor may be constructed and are preferably inductively heated as shown in the above Schroyer et al. application.

The die 10 includes adjustable extrusion nozzle means comprising metal lips 20 and 21 which are detachably secured respectively to the die halves 11 and 12. Adjustment of the spaced apart distance therebetween is provided by pull screws 22 and push screws 23 which extend at right angles to and alternate with each other. The lips 20 and 21 form an extrusion orifice 25 in communication with the inner slot 18 formed between the die parts and connecting with the cavity 16.

A pair of grooves in the die lips 20 and 21 define the opposite halves of a deckle rod chamber or passageway 30 therein which is spaced from the extrusion orifice 25 by planar land portions of the nozzle lips 20 and 21. Although it is not necessary, the chamber 30 may extend the entire width of the die and is preferably set well into the lips 20 and 21 in order that the turbulence which may be imparted to the plastic material passing thereby will not have an adverse effect upon the quality of the extruded product but will be substantially smoothed out by the land portions separating the chamber 30 and the nozzle orifice 25.

As the material being extruded leaves the extrusion orifice 25, it may be discharged onto a chill roll 32, which rotates in the direction indicated by the arrow in FIG. 1.

The width of the film which is formed as the extruded material can be anything less of the full width of the chill roll, depending on the length of die 10. However, it is highly desirable that means be provided for accurately controlling the width of extrusion in the die itself.

For accurately fixing the width of the film, the deckle rod assembly 38, shown in detail in FIGS. 2-5, can be used to advantage. Two assemblies 38 are preferably used, one at each end of the die. The deckle assembly 38 includes a tubular member 40 provided with an annular flange 41 for bolting to an end plate 42 forming part of die 10. The die 10 is preferably insulated at 43, and this insulation is cut away at 44 to permit the attachment of the flange 41 to the end plate 42. The inner end of the tubular member 40 projects, as shown, through the end plate 42 to enable it to communicate with the deckle rod chamber 30.

The tubular member 40 also includes a packing gland 46 provided with a cap 47 by means of which pressure is applied to packing 48 in the gland 46. This pressure may be increased or decreased by moving a pair of adjusting screws 49 toward or from the body of the packing gland. The assembly 38 includes a deckle rod 55 which may readily be moved axially of the die 10 into an advanced or retracted position in the deckle rod chamber 30 by loosening the screws 49, and which is held in axial adjustment when the screws 49 are tightened.

The deckle rod 55 includes a thin-walled flexible outer metal tube 57, the upper half of which is transversely notched at 58. The extent of the tube 57 to the right of the notch 58 defines the operative length of the deckle rod 55, and this portion is split lengthwise at 59 as shown in FIGS. 4 and 5. Within the sheath formed by tube 57 to the left of the notch 58 is a close fitting stiffening rod 60. A recess is formed in the forward end 61 for the reception of a second and flag supporting rod 62 of smaller diameter than the rod 60. The rod 62 is fastened in place in the recess by a metallic bond, as by means of silver solder, and extends substantially coaxially along the operative length of the split portion 59 of the tube 57. Thus the parts within the tube 57 consist essentially of a two-stage core made up of rods 60 and 62, the two being telescoped and connected as described.

Rod 62 is provided at its free end with a short longitudinally extending slot enabling it to receive a double tab 63 of oblong shape forming part of the double-walled blade 64 seen in FIG. 3 and, in enlarged form, in FIG. 5. The tab 63 is held in the slot in the rod 62 by a metallic bond, and it includes a pair of wings 65 which are bent as shown in FIG. 5 to conform to the inside surface of the tube 57, and which are bonded to the tube. The wings 65 serve to rigidify the blade 64, which is formed of two thin sheets of flat metal, and the lower half of the tube 57 is slotted to the extent needed to accommodate the blade 64 as shown in FIG. 5.

It will be noted that the blade 64 is shown in FIG. 3 as bisected by a dotted line 66. In the area to the left of dotted line 66, designated 67, the two thicknesses of metal making up the blade 64 are fastened to each other by a metallic bond. The tangs forming tab 63 are fastened together by the same metallic bond. The area to the right of dotted line 66, designated 68, is free of anything tending to hold the two thicknesses of metal to each other, and in this area blade 64 is free to open up more or less like adjacent pages in a book. The pressure of the stock being extruded, exerted against the inside faces of the blade 64, causes the two thicknesses to separate, preventing leakage by urging the two thicknesses of metal into intimate contact with the side walls or land portions of the extrusion orifice 25.

In a typical case, the tube 57 may be made of Inconel metal. It may have a length of about 16", an outer diameter of ¼" and a wall thickness of .005". The notch 58 will have an included angle of about 30°. The split 59 in the upper half of the tube 57 will be 3/32 of an inch in width. The slot in the lower half of the tube 57 in which the blade 64 is accommodated will have a width of approximately .013 inch. The blade 64 should also be the width of approximately .013 inch which should also be the width of the slot in rod 62 for the reception of double tab 63. The small rod 62 may have an outside diameter of .242" to define an annular space between the rod 62 and the tube 67. The overall thickness of the blade 64, including the metallic bond in the area designated 67, should not exceed .013". Departures from these values may readily be made by persons skilled in the art in which the invention relates.

The effective working and sealing portion of the deckle rod 55 is located to the right of the notch 58. The thin-walled tube 57 is flexible and expansible and effects sealing by expansion to conform to the dimensions of the chamber 30 under extrusion pressure. The slot 59 at the top admits extrusion plastic and pressure to the interior thereof to effect expansion and a net outward force toward the orifice 25 tending to seal the included linear portion of the nozzle against extrusion.

The tube 57 is preferably cylindrical and of uniform dimension throughout its working length, and the entire assembly making up the deckle rod 55 is axially movable to limit and define the width of extrusion. The flexibility of the deckle rod 55 permits it to conform to variations in linearity which are the result of the heating of the die body and the lack of uniformity in expansion of parts which necessarily results when operating at high extrusion temperatures.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A film die for extruding a plastic film comprising a die body, nozzle means in said die body defining a longitudinally extending orifice having adjacent land portions through which said plastic material is extruded, means at said land portions defining opposite halves of a transverse generally cylindrical deckle rod chamber therein, an elongated hollow cylindrical rod slidably received in said chamber having a slit formed substantially the length thereof facing away from said orifice forming flexible walls subject to extrusion pressure conformable with the adjacent walls of said chamber for sealing said orifice along the extending length thereof, and means closing the ends of said rod preventing plastic material flow therethrough.

2. A film die for extruding a plastic film comprising a die body, a pair of die lips mounted on said die body with one of said lips being adjustable with respect to the other defining a longitudinally extending orifice of controllable width having adjacent land portions through which said plastic material is extruded, means in said die lips at said land portions defining opposite halves of a transverse generally cylindrical deckle rod chamber therein, an elongated hollow thin-walled rod having flexible walls conformable to the adjacent walls of said chamber and defining an elongated slit opening into the interior of said rod providing for flow of said plastic material therein, said rod being slidably received in said chamber for forming a seal therein over a range of variations in the extruding width of said orifice for limiting the width of extrusion through said extrusion orifice, and means closing the ends of said rod preventing plastic material flow therethrough.

3. A film die for extruding a plastic film comprising a die body, nozzle means in said die body defining a longitudinally extending orifice having adjacent land portions through which said plastic material is extruded, means formed in said land portions defining opposite halves of a transverse generally cylindrical deckle rod chamber therein, an elongated hollow thin-walled flexible tube slidably received in said chamber for forming a seal therein and limiting the width of extrusion through said extrusion orifice, a rod coaxially mounted within said tube and defining an annular space therebetween, and a flag mounted on the extended end of said rod and proportioned to extend within said orifice, said flag having a pair of adjacent outwardly opening leaves to provide an even unfeathered edge to the extruded film.

4. In a die for use in the extrusion of sheet film, mating die halves provided with an orifice between them for the extrusion of film-forming material, an elongated cavity formed in said orifice, said cavity extending axially of the die, and a deckling device in said cavity, said deckling device taking the form of a rod provided at its inner end with an expansible blade for preventing feathering of the extruded film.

References Cited in the file of this patent

UNITED STATES PATENTS

| | | |
|---|---|---|
| 2,856,476 | Tornberg | Nov. 11, 1958 |
| 2,923,971 | Nelson | Feb. 9, 1960 |
| 2,982,995 | Groleau | May 9, 1961 |

OTHER REFERENCES

"Dupont Information Bulletin," No. X–70, page 5, July 17, 1959, 18–55V. (Copy in Group 150.)